United States Patent [19]

Ernst

[11] 4,369,578

[45] Jan. 25, 1983

[54] ENCAPSULATED ANGLE MEASURING APPARATUS

[75] Inventor: Alfons Ernst, Traunreut, Fed. Rep. of Germany

[73] Assignee: Dr. Johannes Heidenhain GmbH, Traunreut, Fed. Rep. of Germany

[21] Appl. No.: 75,136

[22] Filed: Sep. 12, 1979

[30] Foreign Application Priority Data

Sep. 23, 1978 [DE] Fed. Rep. of Germany ........ 2841501

[51] Int. Cl.³ .............................................. G01D 5/34
[52] U.S. Cl. .............................. 33/1 PT; 33/174 TD; 250/231 SE; 277/95; 356/152
[58] Field of Search ...... 33/1 PT, 1 N, 1 D, 174 TD, 33/174 TA, 125 C, 1 T; 356/152, 373; 250/231 SE; 277/95; 200/302

[56] References Cited

U.S. PATENT DOCUMENTS

| | | | |
|---|---|---|---|
| 2,367,882 | 1/1945 | McKnight | 277/95 X |
| 2,676,414 | 4/1954 | Derry | 33/174 TD |
| 3,886,354 | 5/1975 | Swiden et al. | 250/231 SE |
| 4,031,595 | 6/1977 | Walker | 33/125 C |
| 4,075,478 | 2/1978 | Walker | 250/231 SE |
| 4,136,958 | 1/1979 | Nelle | 33/125 C |
| 4,165,564 | 8/1979 | Burkhardt | 33/125 C |

FOREIGN PATENT DOCUMENTS 1231762  4/1960  France ........................ 33/174 TA

OTHER PUBLICATIONS

I.B.M. Technical Disclosure Bulletin, vol. 16, No. 2, Jul. 1973, Optical Shaft Encoder, A. J. Bowen.

*Primary Examiner*—William D. Martin, Jr.
*Attorney, Agent, or Firm*—Hume, Clement, Brinks, William & Olds, Ltd.

[57] ABSTRACT

An apparatus for measuring the angular position of a first element, rotatable with respect to a second element, includes an arcuate scale mounted to the first element. An arcuate housing substantially encloses the scale, and defines an arcuate slit which extends along the housing. A pair of sealing elements, one disposed on each side of the slit, are provided to seal the slit, and a scanning unit is disposed within the housing, adjacent the scale. This scanning unit is coupled to the second element by a coupling member, which extends through the slit between the sealing elements, such that the scanning unit moves along the scale when the first element rotates with respect to the second element. This apparatus is particularly suited for rotary or swinging tables having a range of angular movement less than 360°.

4 Claims, 3 Drawing Figures

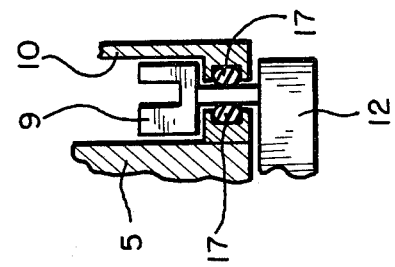
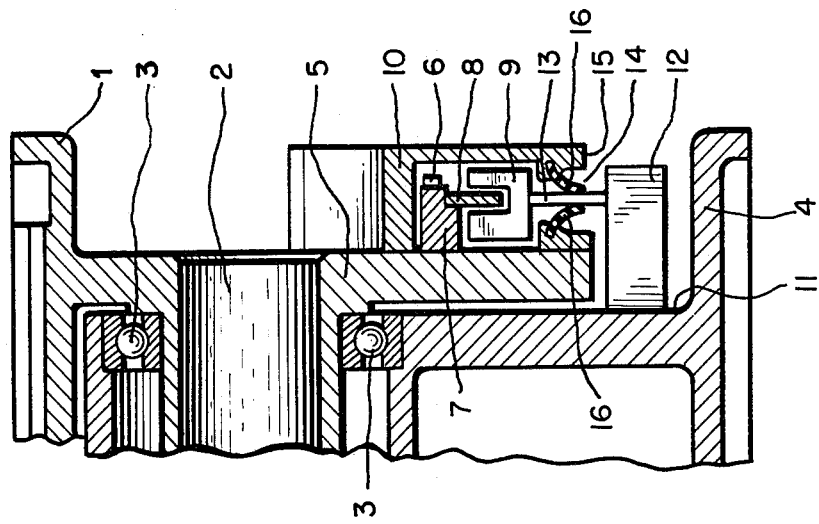
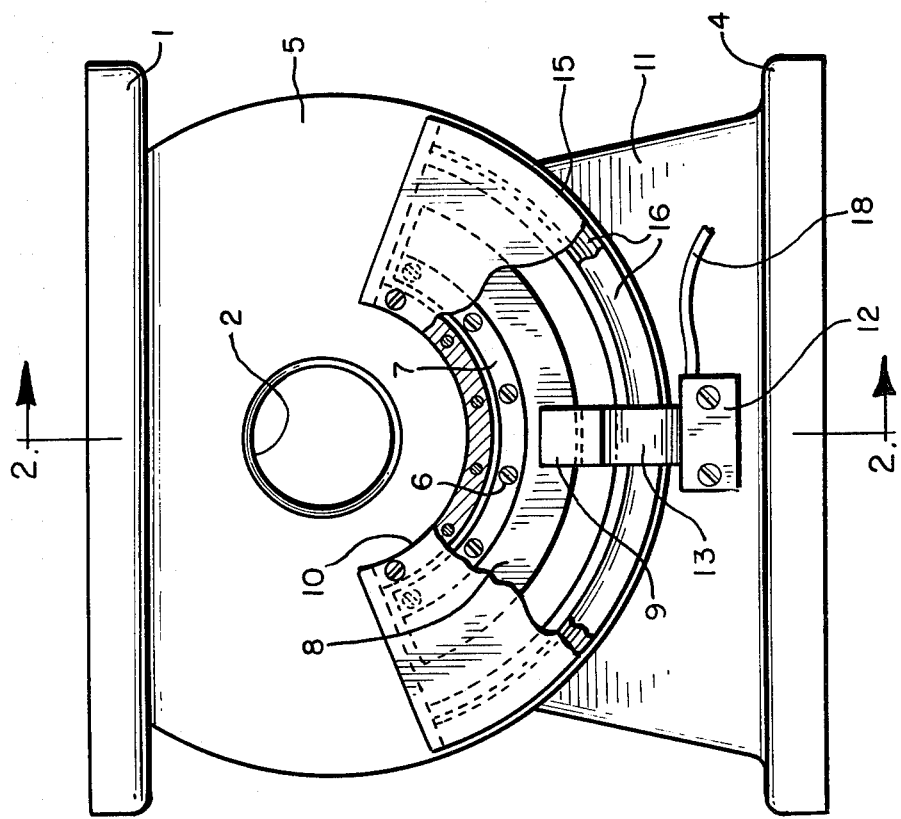

ENCAPSULATED ANGLE MEASURING APPARATUS

BACKGROUND OF THE INVENTION

The present invention relates generally to an encapsulated angle-measuring apparatus for the measurement of angles of rotation, and in particular to such an apparatus for use with rotary or swinging tables having a rotation or swinging range of less than 360°, in which a graduation formed on a scale is scanned by a scanning unit.

It is a known practice to measure the angular position of a rotary or swinging table by means of a commercially available, attachable rotation indicator connected to the table. One such commercially available rotation indicator is described, for example, in the publication Inkrementale Drehgeber ROD; Program 78/79; 66 d 5 8/78 1E; published by Dr. Johannes Heidenhain GmbH, Traunreut, West Germany.

Often, however, such a rotation indicator is not readily adaptable for installation on a rotary table because of the geometry of the table. For example, when a swinging or rotary table is rotatably mounted on a hollow shaft, it may be difficult to adapt the table for use with a conventional rotation indicator.

SUMMARY OF THE INVENTION

The present invention is directed to a small, highly accurate angle-measuring apparatus which can be integrated in a rotary or swinging table. According to this invention, a graduation is formed on an arc-shaped scale. This scale, together with a scanning unit mounted to scan the graduation, is located inside an arc-shaped annular housing which is provided with an arcuate slit. This slit is sealed by correspondingly formed sealing elements, and a blade-like coupling member extends through the slit, between the sealing elements, to connect the scanning unit with one of the parts to be measured.

Further features of the invention are set forth in the claims. The invention, together with further objects and attendant advantages, will be best understood by reference to the following detailed description taken in conjunction with the accompanying drawing.

BRIEF DESCRIPTION OF THE DRAWINGS

FIG. 1 is a side view in partial cutaway of a swinging table including a presently preferred embodiment of the encapsulated angle-measuring apparatus of this invention.

FIG. 2 is a partial sectional view taken along line 2—2 of FIG. 1.

FIG. 3 is a partial cross-sectional view corresponding to a portion of FIG. 2 showing an alternate sealing arrangement.

DETAILED DESCRIPTION OF PREFERRED EMBODIMENTS

Referring now to the drawings, the swinging table represented in FIGS. 1 and 2 includes a planar table plate 1, which is mounted to a horizontal hollow shaft 2. This shaft 2 is rotatably mounted by means of ball bearings 3 to a base 4. The angular range of movement of the table plate is less than 180°. A circular front plate 5 is mounted perpendicularly to the table plate 1, and an arcuate member 7 is mounted to the front plate 5 by means of screw connections 6. An arcuate scale 8 which defines an angle graduation is mounted to the member 7. This scale 8 is scanned in a known manner by a scanning unit 9. For protection against mechanical damage, the scale 8 and the scanning unit 9 are surrounded by a hollow, arcuate housing 10, preferably of aluminum, which is fastened to the front plate 5.

Adjacent the housing 10 a mounting foot 12 is attached to a vertical surface 11 of the base 4. This mounting foot 12 is provided with a blade-shaped coupling member 13 which passes through a slit 14 in the circularly curved lower surface 15 of the housing 10 and is coupled to the scanning unit 9. In order to substantially prevent the penetration of contaminants into the interior of the housing 10, the slit 14 is closed by arcuate, elastomeric sealing lips 16 inclined toward one another such that the cross-section of the pair of sealing lips forms an apex. In a second preferred embodiment shown in FIG. 3, the sealing of the slit 14 is accomplished by arcuate sealing strips 17 of circular cross-section which extend adjacent the curved slit 14.

Electric signals generated by the scanning unit 9 which encode the angle of rotation of the table plate 1 are fed by means of an electric cable 18 to a conventional evaluating and indicating unit (not shown).

In another preferred embodiment (not shown) the scale and the housing are mounted to the base and the mounting foot with the blade-shaped coupling member is secured to the rotatably mounted front plate.

One important advantage of the present invention is that a highly accurate angle-measuring apparatus can be integrated with a swinging table with a substantial saving of space. The use of a conventional, attachable precision rotation indicator with its large space requirement can be dispensed with. Likewise, the present invention is usable in devices which, for geometrical reasons, are ill suited for use with an attachable rotation indicator. Since the radius of the graduation of the angle-measuring apparatus of this invention is in many cases greater than that of the graduation of a commercially available rotation indicator, the present invention may additionally provide a higher angular resolution.

Of course, it should be understood that various changes and modifications to the preferred embodiments described herein will be apparent to those skilled in the art. For example, the encapsulated angle-measuring device of the present invention can be successfully used with photoelectric, optical, inductive, capacitive and magnetic scanning units and with scales which encode position in either the absolute or the incremental measurement mode. Such changes and modifications can be made without departing from the spirit and scope of the present invention, and without diminishing its attendant advantages. It is, therefore, intended that such changes and modifications be covered by the following claims.

I claim:

1. An apparatus for measuring the angular position of a first element, rotatably mounted with respect to a second element by means of a guide, said apparatus comprising:
    an arcuate scale mounted to the first element, said scale extending over an angular range of less than 360°;
    an arcuate housing substantially enclosing the scale, said housing defining an arcuate slit extending along the housing;

a pair of sealing elements, one disposed on either side of the slit to substantially seal the slit;

a scanning unit disposed to move within the housing adjacent the scale for measuring relative motion between the scanning unit and the scale; and a blade shaped coupling member, coupled to the scanning unit, extending through the slit between the sealing members and mounted to the second element such that rotational movement between the first and second elements about the guide causes the scanning unit to move along the scale.

2. The apparatus of claim 1 wherein each sealing element includes an arcuate, flexible sealing lip, and the pair of sealing elements are inclined toward one another such that the cross section of the pair of sealing elements forms an apex.

3. The apparatus of claim 1 wherein each sealing element includes an elastomeric arcuate sealing strip having a substantially circular cross section.

4. An apparatus for measuring the angular position of a first element with respect to a second element, wherein the first element is mounted to rotate with respect to the second element by means of a bearing, said apparatus comprising:

an arcuate scale mounted to the first element, said scale extending over an angular range of less than 360°;

an annular, arcuate housing disposed around the scale to substantially enclose the entire scale and thereby protect the scale from environmental influences, said housing defining an arcuate slit therein;

a blade shaped coupling member mounted to the second element to pass through the arcuate slit into the interior of the housing such that the coupling member is guided by the bearing to move along the length of the slit as the first element rotates with respect to the second element;

a scanning unit directly mounted to the coupling member inside the housing adjacent the scale such that the scanning unit is guided by the bearing to move along the scale as the first element rotates with respect to the second element; and a pair of resilient sealing members, each sealing member mounted to the housing adjacent a respective side of the arcuate slit such that the coupling member extends between the sealing members and the sealing members cooperate to seal the slit around the coupling member while allowing the coupling member to move along the arcuate slit.

* * * * *

UNITED STATES PATENT AND TRADEMARK OFFICE
CERTIFICATE OF CORRECTION

PATENT NO. : 4,369,578

DATED : January 25, 1983

INVENTOR(S) : Alfons Ernst

It is certified that error appears in the above—identified patent and that said Letters Patent is hereby corrected as shown below:

```
In the Attorney, Agent or Firm please delete
"William" and insert therefor --Willian--.
In claim 2 line 16 and 17 please delete "element"
and "s" , respectively, and insert therefor
--elements--.
```

Signed and Sealed this

Thirtieth Day of August 1983

[SEAL]

Attest:

Attesting Officer

GERALD J. MOSSINGHOFF

Commissioner of Patents and Trademarks